Dec. 4, 1934.  J. JONAS  1,983,086
ELECTRIC TRANSMISSION LINE PROTECTIVE SYSTEM
Filed Aug. 24, 1931
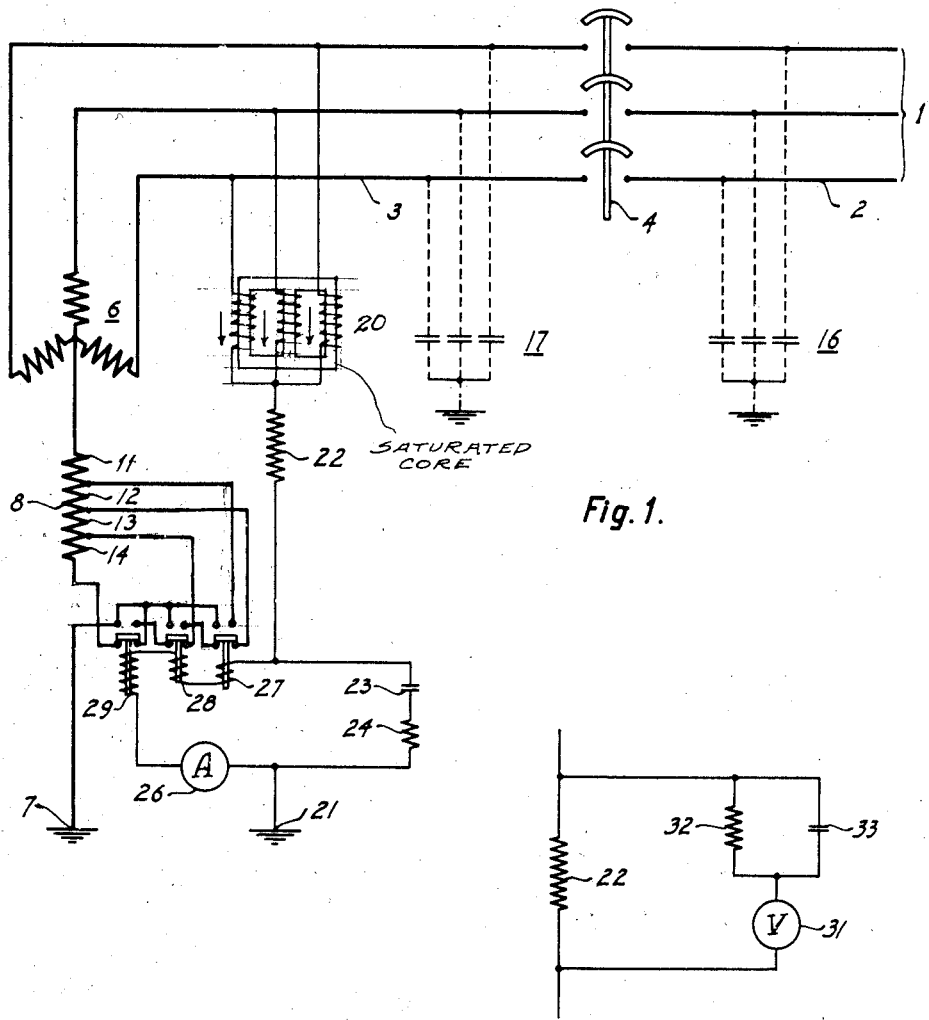
Fig.1.
Fig.2.
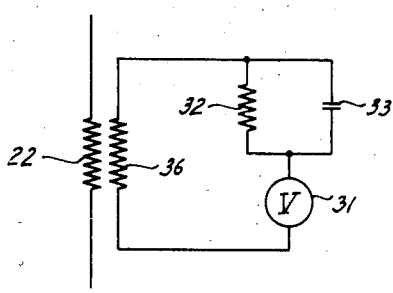
Fig.3.
Inventor
Julius Jonas
By *Alfred H. Dyson*
Attorney Patented Dec. 4, 1934

1,983,086

UNITED STATES PATENT OFFICE 1,983,086

ELECTRIC TRANSMISSION LINE PROTECTIVE SYSTEM

Julius Jonas, Baden, Switzerland, assignor to Aktiengesellschaft Brown Boveri & Cie., Baden, Switzerland, a joint-stock company of Switzerland Application August 24, 1931, Serial No. 559,015
In Switzerland August 26, 1930

15 Claims. (Cl. 172—237)

This invention relates to improvement in systems in protecting electric transmission lines in case of grounds and particularly to means for determining the active length of the transmission lines at any moment.

One of the most important problems relating to grounding protection for high-voltage transmission lines of which portions may be connected or disconnected, is the ascertainment of the active length of the network at any moment and the quickest possible automatic adjustment of the grounding inductance to a value corresponding to such network length.

Different methods have already been proposed as solutions for the above problem but such proposed solutions in part were incomplete and in part required complicated auxiliary devices and special measuring arrangements which prevented the practical use of the proposed solutions of the problem. Thus, it has been proposed to maintain continually an incomplete grounding connection over a relatively high resistance at the point at which measurements are to be taken and to use the slight current flowing to ground through the resistance as a measurement of the active length of the network at any moment. Such arrangement may, however, be used only for an absolutely symmetrical network for the reason that, even in a perfectly sound network, each dissymmetry of the network causes a dissymmetrical current to flow through the measuring device which current cannot in any way be used to determine the length of the line at that moment.

Another proposed solution of the problem consists in the connection of an external source of current in the form of an auxiliary generator supplying a variable frequency to the quenching inductance in the grounding circuit and in varying the frequency until the desired degree of resonance is obtained between the inductance in the ground circuit and the partial capacitances of the connected network portions with respect to ground. Such resonance is produced either from the amount or phase of the current with respect to the voltage produced and may be indicated by an instrument measuring such amount. The frequency required to produce such resonance is then a measurement of the length of the high-voltage network at that moment. The above method, as may be easily seen, is however undesirably complicated in that it requires the measurement of different amounts and the regulation of the frequency of the generator.

A simpler method of solving the above problem is disclosed in the present invention which is an arrangement for measuring the length of a three-phase high-voltage network at any moment by measuring the partial capacitance of the network to ground. A winding having a neutral point such as a plurality of reactances connected to form a neutral point or a star-connected secondary winding of a transformer are connected to ground through an inductance connected at the neutral point and the cores of the neutral point windings are highly saturated.

Devices are provided for measuring the amount of current flowing in the circuit which current is determined by the reactance of the circuit and on which a $3.n$ harmonic is impressed in which $n$ is a suitable whole number. A star-connected secondary transformer winding or a plurality of reactance coils wound on the saturated cores, connected to form a neutral point, if no neutral conductor is connected to the star point, is not capable of generating a $3.n$ harmonic current because it must flow simultaneously toward or from the neutral point in all three phases and there is no possibility of supply to or discharge from such neutral points.

If the neutral point of a winding is however connected through an inductance to ground, a current of a $3.n$ harmonic can flow to ground if the circuit is closed anywhere. Such is the case if the grounded circuit is conductively connected with the high voltage line through the partial capacitances of the network relative to ground so that the circuit of the $3.n$ harmonic is closed over such partial capacitance. The capacitive reactance is however variable with the length of the network at any moment and, accordingly, the $3.n$ harmonic current or the reactance of this circuit will also be variable and may serve as a measurement of the length of the line. To make such measurement very simple, it is preferable so to proportion the inductance of the grounded circuit that it is in approximate resonance with the partial capacitance of the entire transmission line to ground with respect to the $3.n$ harmonics so that even very slight changes in the network result in large variation of the $3.n$ harmonic current flowing in the measuring circuit.

It is, therefore, among the objects of the present invention to provide a system for determining the actual length at any moment of a transmission line connected with a source of current.

Another object of the invention is to provide means for measuring the partial capacitances of a transmission line to ground.

Another object of the invention is to provide a system employing a grounded inductance for the protection of a transmission line from ground fault connections in which the magnitude of the inductance is varied in response to the length of the line at any moment.

Another object of the invention is to provide a system employing a grounded inductance for the protection of transmission lines from ground fault connections in which the magnitude of the inductance is varied by the action of a $3.n$ harmonic current in a resonant circuit tuned thereto for a particular length of the line.

Objects and advantages, other than those above set forth, will be apparent from the following description when read in connection with the accompanying drawing in which Figure 1 diagrammatically illustrates one embodiment of the invention in which a variable inductance grounding the neutral point of a source is controlled in dependence on the length of a transmission line connected with the source.

Figs. 2 and 3 diagrammatically illustrate a portion of the system shown in Fig. 1 but illustrating modifications of the measuring means used and the connection thereof with the system.

Referring more particularly to the drawing by characters of reference, the reference numeral 1 designates a high-voltage line which is divided into a plurality of sections 2 and 3 capable of connection and disconnection by means of a circuit breaker 4 and which is supplied from a source of current 6 having a neutral point grounded as at 7 through an inductance 8 which is tapped and thereby divided into the sections 11, 12, 13 and 14.

The partial capacitances of the line sections 2 and 3 to ground are indicated at 16 and 17 respectively.

The star-connected secondary winding of a highly saturated transformer or a plurality of reactance coils 20 having highly saturated cores and having a neutral point, are connected across all three phases of the line section 3 and the neutral point of the reactance coils or of the transformer secondary is grounded as at 21 through an inductance 22, a capacitance 23 and an inductance 24. The windings of the transformer or reactances 20 have impressed thereon a three phase system of sinusoidal voltages of the frequency of the source of supply 6 and, by virtue of the saturation of the cores thereof, current having a component of the fundamental frequency of the source 6 and a third harmonic component thereof flows in said windings. The currents of the third harmonic frequency are in phase coincidence and flow through the reactance 22, the coils of the relays 27, 28 and 29 and through the ammeter 26 to ground. The inductance 24 and the capacitance 23 are connected across the ammeter 26 and the relays 27, 28, and 29 to form a circuit tuned to the fundamental operating frequency to thereby bypass around. The ammeter currents of the fundamental frequency and any ground current in the circuit of inductance 22, which would be caused by dissymmetries in the network are not indicated thereby. The currents of the $3.n$ harmonics have the same value, flow in the same direction and have the same phase in all three phases of the transformer winding or reactance coils 20 as is indicated by the arrows.

The current to be measured is accordingly grounded through the inductance 22 and returns to the line 1 over the capacitances 16 and 17. The magnitude of such current is dependent on the line sections connected with the source as controlling the parallel connection of the capacitances 16 and 17 and therefore is a measure of the length of the line from the source. To obtain currents of a convenient amplitude, it is preferable to have $n=1$ and to so dimension the inductance 22 that it is in resonance with the partial capacitances of the entire network to ground with respect to the third harmonic. Instead of using an ammeter 26, a voltmeter may also be connected to the terminals of the inductance 22 which will then measure the voltage drop of the third harmonic. A blocking circuit for the current of the fundamental frequency must then be connected in the circuit of the voltmeter to prevent indication in the voltmeter of voltages in the inductance 22 due to dissymmetries in the network. Such a blocking circuit may comprise, as shown in Fig. 2 of the drawing, an inductance 32 and a capacitance 33 connected in parallel and so proportioned as to be tuned to resonance with the frequency of the supply source. The voltmeter may also be connected in the circuit of a coil 36 inductively coupled with the inductance 22 as shown in Fig. 3 of the drawing which arrangement has the advantage that the current and range of the instrument may then be freely chosen.

The presence of a quenching inductance for grounding protection does not in any way alter the operation of the arrangement. The inductance 8 is to be maintained approximately in resonance with the partial capacitances of the network to ground with respect to the fundamental frequency. The inductance 8 is tapped and thereby divided into a plurality of sections as previously described and is controlled by a plurality of relays 27, 28 and 29, the coils of which are connected in parallel with the tuned circuit 23, 24. Inductance 8 provides a return path in parallel with the line capacitances 16 and 17 for the $3.n$ harmonic generated in windings 20.

In practice however, inductance 8 will either be accurately tuned with the line capacitance for the operating or fundamental frequency or else will be detuned very slightly. The inductive reactance of inductance 8 is thus at least substantially equal to the capacitive reactance of the line for the fundamental frequency. For the third harmonic the reactance of inductance 8 becomes three times larger whereas the reactance of the line becomes three times smaller or one-ninth of the reactance of inductance 8. Thus nine-tenths of the third harmonic current will flow through the line capacitances and one-tenth will flow through reactance 8. The above action introduces a certain error in the measurement but such error may be compensated by suitably adjusting relays 27, 28 and 29 and recalibrating the ammeter 26. If $n$ is greater than 1 the $n$th harmonic current flowing through the reactance coil 8 becomes negligibly small. The relays 27, 28 and 29 are so arranged as to operate at different current values. Thus when only section 3 of the line 1 is connected, the third harmonic current flowing through the coils of the relays is very small and all of the relay armatures remain in the position shown. The entire inductance 8 is then in circuit, being so constructed as to be in resonance with line section 3 for the fundamental frequency. If the section 2 of the line is connected the current flowing through the coils of the relays is increased thereby causing lifting of the armature of relay 29 which cuts out section 14 of inductance 8 thus tuning the inductance to the capacitances 17 and 16 and thereby forming a measurement of the length of the line. Inductance 8 is thus automatically tuned to the fundamental frequency of the line; the protection of a high-voltage installation is materially simplified and facilitated and the degree of protection obtainable therefor is materially increased.

Although but one embodiment of the present invention has been illustrated and described, it will be apparent to those skilled in the art that various changes and modifications may be made therein without departing from the spirit of the invention or from the scope of the appended claims.

The invention claimed is:

1. In a system for protecting electric transmission lines and the like from the effects of ground fault connections, a transmission line, a source of electric current connected with said line and having a neutral point, an inductance connected with the neutral point of said source and ground, means connected with said line and ground operable to convert current supplied from said source into current of harmonic frequency relative to the fundamental frequency of said source of current, and means supplied by the said current of harmonic frequency operable to vary the amount of said inductance in circuit in dependence upon the capacitance of said line to ground.

2. In a system for protecting electric transmission lines and the like from the effects of ground fault connections, a transmission line, a source of electric current connected with said line and having a neutral point, an inductance connected with the neutral point of said source and ground, said inductance being tapped, means connected with said line and ground operable to convert current supplied from said source into current of harmonic frequency relative to the fundamental frequency of said source of current, and means operable by the said current of harmonic frequency current for connecting different taps of said inductance in circuit in dependence upon the capacitance of said line to ground.

3. In a system for protecting electric transmission lines and the like from the effects of ground fault connections, a transmission line, a source of electric current connected with said line and having a neutral point, an inductance connected with the neutral point of said source and ground, said inductance being divided into sections by taps, windings having a neutral point and arranged on a highly saturated core, an inductance connecting the neutral point of said windings with ground, and means connected between the second said inductance and ground for connecting different taps of the first said inductance in circuit in dependence upon the capacitance of said line to ground.

4. In a system for protecting electric transmission lines and the like from the effects of ground fault connections, a transmission line, a source of electric current connected with said line and having a neutral point, an inductance connected with the neutral point of said source and ground, said inductance being divided into sections by taps, windings having a neutral point and arranged on a highly saturated core, an inductance connecting the neutral point of said windings with ground, and a plurality of relays connected between the second said inductance and ground sequentially operable to connect different taps of the first said inductance in circuit in dependence upon the capacitance of said line to ground.

5. In a system for protecting electric transmission lines and the like from the effects of ground fault connections, a transmission line, a source of electric current connected with said line and having a neutral point, an inductance connected with the neutral point of said source and ground, said inductance being divided into sections by taps, windings having a neutral point and arranged on a highly saturated core, an inductance connecting the neutral point of said windings with ground, a plurality of relays connected in circuit between the second said inductance and ground sequentially operable responsive to and in dependence upon the magnitude of the current flowing through the said windings to connect different taps of the first said inductance in circuit in dependence upon the capacitance of said line to ground, said relays being connected in series, and a measuring instrument connected in series with said relays operable responsive to current flowing through the said windings for indicating the length of said line as determined by the capacitance thereof to ground.

6. In a system for protecting electric transmission lines and the like from the effects of ground fault connections, a transmission line, a source of electric current connected with said line and having a neutral point, an inductance connected with the neutral point of said source and ground, said inductance being divided into sections by taps, windings having a neutral point and arranged on a highly saturated core, an inductance connecting the neutral point of said windings with ground, and a plurality of relays connected between the second said inductance and ground sequentially operable responsive to and in dependence upon the magnitude of current flowing through said windings to connect different taps of the first said inductance in circuit in dependence upon the capacitance of said line to ground, said relays being connected in series, a measuring instrument connected in series with said relays operable responsive to and in dependence upon the magnitude of the current flowing through said windings for indicating the length of said line as determined by the capacitance thereof to ground, and a series resonant circuit connected in parallel with said relays and said instrument tuned to the frequency of said source of electric current.

7. In a system for protecting electric transmission lines in case of grounding thereof, a transmission line divided into a plurality of interconnectible sections, a source of alternating current supplying said line, said source having a neutral point, a variable inductance connected with the neutral point of said source and with ground, windings provided with a highly saturated core operable to convert current supplied from said source into current having a harmonic frequency of $3n$ ($n$ being any whole number) times the fundamental frequency of said source of current connected with said line and formed with a neutral point, means connected with said windings and operable by said current of harmonic frequency to retain said inductance within a predetermined degree of resonance with the capacitance of said line to ground at the fundamental frequency of said source of current.

8. In a system for protecting and indicating the length of transmission lines and the like, a transmission line, a source of alternating current connected with said line and having a neutral point, a variable inductance connecting said neutral point with ground for protecting said line from the effects of ground fault connections therewith, windings arranged about a highly saturated core connected with said line, the said windings being operable to convert current supplied from said source into current having a harmonic frequency of $3n$ ($n$ being any whole number) times the fundamental frequency of said source and being formed with a neutral point, an inductance and a plurality of relays and a measuring instrument serially connected in circuit between the last said neutral point and ground operable responsive to flow of said current of harmonic frequency in said line in magnitude in dependence upon the capacitance of said line to ground, the operation of said relays being effective to vary the first said inductance, and the operation of said instrument being effective to indicate the length of said line as determined by the capacitance thereof to ground.

9. In a system for protecting and indicating the length of transmission lines and the like, a transmission line, a source of alternating current connected with said line and having a neutral point, a variable inductance connecting said neutral point with ground for protecting said line from the effects of ground fault connections therewith, windings arranged about a highly saturated core connected with said line operable to convert current supplied from said source into current having a harmonic frequency of $3n$ ($n$ being any whole number) times the fundamental frequency of said source and being formed with a neutral point, an inductance and a plurality of relays and a measuring instrument serially connected in circuit between the last said neutral point and ground operable responsive to and in dependence upon the flow of said currents of harmonic frequency, the said relays being sequentially operable to vary the first said inductance in dependence upon the magnitude of said currents of harmonic frequency flowing in said line, and the said instrument being operable to indicate the length of said line as determined by the capacitance thereof to ground, and means arranged to form a series resonant circuit tuned to the fundamental frequency of said source connected in parallel with said relays and instrument for diverting the flow of currents of the fundamental frequency of said source therefrom to ground.

10. In a system for indicating the lengths of electric transmission lines and the like, a transmission line, a plurality of windings arranged about a highly saturated core connected with said line and having a neutral point, a source of alternating current connected with said line and supplying said windings to produce in the latter current having a harmonic frequency of $3n$ ($n$ being any whole number) times the fundamental frequency of said source, and an instrument connecting said neutral point with ground operable responsive to flow of said current of harmonic frequency in said line to indicate the length of the latter as determined by the capacitance thereof to ground.

11. In a system for indicating the lengths of electric transmission lines and the like, a transmission line divided into a plurality of interconnectible sections, a plurality of windings arranged about a highly saturated core connected with said line and having a neutral point, a source of alternating current connected with said line and supplying said windings to produce in the latter current having a harmonic frequency of $3n$ ($n$ being any whole number) times the fundamental frequency of said source, an instrument connecting said neutral point with ground operable responsive to flow of said current of harmonic frequency in said line to indicate the length of the latter as determined by the capacitance of connected sections thereof to ground, and means tuned to the fundamental frequency of said source connected in parallel with said instrument for diverting the flow of currents having the fundamental frequency of said source therethrough from said instrument.

12. In a system for indicating the lengths of electric transmission lines and the like, a transmission line, a plurality of windings arranged about a highly saturated core connected with said line and having a neutral point connected with ground, a source of alternating current connected with said line and supplying said windings to produce in the latter current having a harmonic frequency of $3n$ ($n$ being any whole number) times the fundamental frequency of said source, an inductance included in the connection between said neutral point and ground, and an instrument connected in parallel with said inductance operable responsive to flow of said current of harmonic frequency in said line and through said inductance to indicate the length of said line as determined by the capacitance of the latter to ground.

13. In a system for indicating the length of electric transmission lines and the like, a transmission line, a plurality of windings arranged about a highly saturated core connected with said line and having a neutral point connected with ground, a source of alternating current connected with said line and supplying said windings to produce in the latter current having a harmonic frequency of $3n$ ($n$ being any whole number) times the fundamental frequency of said source, an inductance included in the connection of said neutral point with ground, an instrument connected in parallel with said inductance operable responsive to flow of said current of harmonic frequency in said line and through said inductance to indicate the length of said line as determined by the capacitance of the latter to ground, and means arranged as a parallel resonant circuit tuned to the fundamental frequency of said source of alternating current included in the connections of said instrument operable to prevent the flow of current having the fundamental frequency of said alternating current through said instrument.

14. In a system for indicating the lengths of electric transmission lines and the like, a transmission line, a plurality of windings arranged about a highly saturated core connected with said line and having a neutral point connected with ground, a source of alternating current connected with said line and supplying said windings to produce in the latter current having a harmonic frequency of $3n$ ($n$ being any whole number) times the fundamental frequency of said source, an inductance included in the connections between said neutral point and ground, an instrument inductively connected with said inductance operable responsive to flow of said current of harmonic frequency in said line and through said inductance to indicate the length of said line as determined by the capacitance of the latter to ground.

15. In a system for indicating the lengths of transmission lines and the like, a transmission line divided into a plurality of interconnectible sections, a plurality of windings arranged about a highly saturated core connected with said line and having a neutral point connected with ground, a source of alternating current connected with said line and supplying said windings to produce in the latter current having a harmonic frequency of $3n$ ($n$ being any whole number) times the fundamental frequency of said source, an inductance included in the connection between said neutral point and ground, an instrument serially included in a closed circuit with a winding inductively coupled with said inductance operable responsive to flow of said current of harmonic frequency in said line and through said inductance to indicate the length of said line as determined by the capacitance of connected sections thereof to ground, and means connected as a parallel resonant circuit tuned to the fundamental frequency of said source of alternating current serially included in the said closed circuit for preventing the flow of currents having the fundamental frequency of said source of alternating current through said instrument.

JULIUS JONAS.